(12) United States Patent
Dai et al.

(10) Patent No.: US 11,260,325 B2
(45) Date of Patent: Mar. 1, 2022

(54) FILTERING DEVICE FOR REMOVING IMPURITIES IN A MIXTURE OF BIOLOGICAL DIATOMITE

(71) Applicant: Tongji University, Shanghai (CN)

(72) Inventors: Xiaohu Dai, Shanghai (CN); Bin Lu, Shanghai (CN); Xiaoli Chai, Shanghai (CN); Boran Wu, Shanghai (CN); Zheng Zhou, Shanghai (CN); Xiuzhong Wang, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 27 days.

(21) Appl. No.: 16/992,145

(22) Filed: Aug. 13, 2020

(65) Prior Publication Data
US 2021/0205741 A1 Jul. 8, 2021

(30) Foreign Application Priority Data
Jan. 6, 2020 (CN) .......................... 202010008273.6

(51) Int. Cl.
| | |
|---|---|
| *B01D 29/56* | (2006.01) |
| *B01D 29/03* | (2006.01) |
| *B01D 29/90* | (2006.01) |
| *B01D 29/92* | (2006.01) |
| *C02F 1/00* | (2006.01) |

(52) U.S. Cl.
CPC ............ *B01D 29/56* (2013.01); *B01D 29/035* (2013.01); *B01D 29/902* (2013.01); *B01D 29/925* (2013.01); *C02F 1/004* (2013.01); *B01D 2201/184* (2013.01)

(58) Field of Classification Search
None
See application file for complete search history.

(56) References Cited

U.S. PATENT DOCUMENTS

| | | | | |
|---|---|---|---|---|
| 311,485 | A | * | 2/1885 | Gridley et al. ........... B07B 1/46 209/412 |
| 566,260 | A | * | 8/1896 | Wightman .............. B07B 1/286 209/348 |
| 571,776 | A | * | 11/1896 | Long ........................ E04D 13/08 210/318 |
| 678,857 | A | * | 7/1901 | Betzold ................ B01D 36/001 210/313 |

(Continued)

*Primary Examiner* — Robert J Popovics
(74) *Attorney, Agent, or Firm* — Böyramoglu L.aw Offices L.L.C

(57) ABSTRACT

The present invention discloses a filtering device used for removing impurities in a mixture of biological diatomite, which relates to the technical field of sewage treatment. This device includes a plurality of deflectors evenly distributed in multiple layers in the vertical direction. Each deflector includes a shell and a top plate. There is a filter unit symmetrically arranged on the left and right sides of each deflector. The top of the shell is covered with a top plate hinged with the depressed plate. The bottom of the shell is provided with water inlets which communicate with the shunt pipe, and the upper parts of the left and right side walls of the shell are provided with overflow ports. The shell also has a plurality of diversion folding plates located below the overflow ports and vertically staggered and distributed on the left and right side walls. The filter unit includes an inclined water guiding groove and a filtering plate.

9 Claims, 3 Drawing Sheets

(56) References Cited

U.S. PATENT DOCUMENTS

| | | | | |
|---|---|---|---|---|
| 690,082 A * | 12/1901 | Snyder | B03B 1/04 | 209/4 |
| 786,184 A * | 3/1905 | Benefield | B07B 7/02 | 209/143 |
| 955,843 A * | 4/1910 | Bossert | B01D 29/33 | 210/355 |
| 968,242 A * | 8/1910 | Inman | B03B 5/623 | 209/17 |
| 1,104,772 A * | 7/1914 | Black | B01D 29/01 | 210/339 |
| 1,333,127 A * | 3/1920 | Nall | B07B 4/02 | 209/145 |
| 1,360,834 A * | 11/1920 | Wallace | B07B 7/06 | 209/142 |
| 1,424,451 A * | 8/1922 | Crandall | B07B 1/04 | 209/413 |
| 1,510,742 A * | 10/1924 | Gutleben | B07B 1/4609 | 209/420 |
| 1,653,473 A * | 12/1927 | Schulz | E04D 13/08 | 210/130 |
| 1,725,511 A * | 8/1929 | Flanagan | B07B 1/343 | 209/347 |
| 1,803,112 A * | 4/1931 | Helfenbein | F24B 15/007 | 209/373 |
| 1,990,214 A * | 2/1935 | Zapffe | C02F 1/64 | 210/722 |
| 2,090,997 A * | 8/1937 | French | E04D 13/08 | 210/433.1 |
| 2,095,504 A * | 10/1937 | Kesti | A01K 69/00 | 210/160 |
| 2,133,974 A * | 10/1938 | Cowles | B01D 35/28 | 209/273 |
| 2,158,169 A * | 5/1939 | Wright | B01D 35/28 | 210/806 |
| 2,308,572 A * | 1/1943 | Symons | B07B 1/12 | 209/393 |
| 2,317,430 A * | 4/1943 | Ayers | B07B 1/00 | 209/268 |
| 2,419,501 A * | 4/1947 | Pinto | E04D 13/08 | 210/316 |
| 2,450,006 A * | 9/1948 | Lesniak | B01D 29/071 | 210/348 |
| 2,463,814 A * | 3/1949 | Skinner | D21F 1/66 | 210/354 |
| 2,494,780 A * | 1/1950 | Schmidt | E04D 13/0645 | 210/357 |
| 2,748,941 A * | 6/1956 | Basten | B03B 5/60 | 209/251 |
| 2,814,388 A * | 11/1957 | Dreissen | B07B 1/00 | 209/251 |
| 2,872,041 A * | 2/1959 | Dreissen | B07B 1/00 | 209/273 |
| 2,883,051 A * | 4/1959 | Maeder | B07B 1/00 | 209/269 |
| 2,916,142 A * | 12/1959 | Fontein | B07B 1/00 | 209/274 |
| 2,942,730 A * | 6/1960 | Fontein | B07B 1/00 | 209/274 |
| 2,973,865 A * | 3/1961 | Cibula | B07B 1/28 | 209/315 |
| 2,984,356 A * | 5/1961 | Bruninghaus | B07B 1/46 | 209/319 |
| 3,007,574 A * | 11/1961 | De Koning | B01D 35/28 | 209/251 |
| 3,124,530 A * | 3/1964 | Jakobs | B01D 35/20 | 210/389 |
| 3,135,690 A * | 6/1964 | Eder | B01D 35/20 | 210/389 |
| 3,221,877 A * | 12/1965 | De Koning | B07B 13/07 | 209/314 |
| 3,259,244 A * | 7/1966 | Kaljo | B01D 35/28 | 209/240 |
| 3,261,470 A * | 7/1966 | Daniels | B07B 1/42 | 210/106 |
| 3,307,698 A * | 3/1967 | Haffner | B07B 1/005 | 209/258 |
| 3,344,919 A * | 10/1967 | Leeman | B07B 1/4681 | 209/251 |
| 3,353,674 A * | 11/1967 | Leeman | B07B 1/00 | 209/240 |
| 3,363,769 A * | 1/1968 | Wilmot | B01D 29/52 | 210/251 |
| 3,420,658 A * | 1/1969 | Berhenke | C22B 9/02 | 75/409 |
| 3,446,349 A * | 5/1969 | Benzon | B01D 29/014 | 209/17 |
| 3,451,555 A * | 6/1969 | Ginaven | B01D 35/28 | 210/433.1 |
| 3,452,876 A * | 7/1969 | Ginaven | B01D 35/28 | 210/409 |
| 3,477,571 A * | 11/1969 | Maag | D21D 5/04 | 209/250 |
| 3,483,974 A * | 12/1969 | Pearsall | B07B 1/343 | 209/273 |
| 3,572,505 A * | 3/1971 | Jongbloed | B07B 1/46 | 209/240 |
| 3,640,383 A * | 2/1972 | Wantling | B07B 1/00 | 209/17 |
| 3,712,476 A * | 1/1973 | Cohen-Alloro | B07B 1/00 | 210/387 |
| 3,777,893 A * | 12/1973 | Ginaven | B01D 29/03 | 210/499 |
| 3,813,298 A * | 5/1974 | Chwalek | C08B 30/044 | 127/69 |
| 3,815,740 A * | 6/1974 | Ginaven | B07B 1/12 | 209/264 |
| 3,833,123 A * | 9/1974 | Walker | B01D 29/05 | 210/241 |
| 3,835,999 A * | 9/1974 | Moore | B07B 1/12 | 209/251 |
| 3,859,713 A * | 1/1975 | Fiedler | B01D 35/28 | 29/423 |
| 3,928,207 A * | 12/1975 | Wace | B01D 35/28 | 210/252 |
| 3,929,642 A * | 12/1975 | Ennis | B01D 35/28 | 210/113 |
| 3,929,647 A * | 12/1975 | Kempa | B07B 13/16 | 209/395 |
| 3,970,549 A * | 7/1976 | Ennis | B01D 35/28 | 209/341 |
| 3,982,499 A * | 9/1976 | Frankl | A01K 1/0103 | 119/450 |
| 3,993,567 A * | 11/1976 | Ginaven | B01D 39/10 | 210/498 |
| 4,039,456 A * | 8/1977 | Stoev | B01D 11/0261 | 210/388 |
| 4,042,511 A * | 8/1977 | Ginaven | B01D 35/28 | 210/386 |
| 4,046,694 A * | 9/1977 | Ellis | B01D 35/20 | 210/297 |
| 4,065,382 A * | 12/1977 | Derrick, Jr. | B07B 1/282 | 209/313 |
| 4,071,193 A * | 1/1978 | Sternby | B01D 35/28 | 239/11 |
| 4,097,382 A * | 6/1978 | Cruea | B01D 35/28 | 209/264 |
| 4,113,626 A * | 9/1978 | Detcher | B01D 35/28 | 209/264 |
| 4,120,790 A * | 10/1978 | Tinker | B01D 29/014 | 210/767 |
| 4,122,001 A * | 10/1978 | Snyder | A01M 5/00 | 209/675 |
| 4,128,474 A * | 12/1978 | Ennis | B03B 5/626 | 209/2 |
| 4,190,678 A * | 2/1980 | Pleus | A23N 15/00 | 209/234 |
| 4,193,503 A * | 3/1980 | Connolly | B01D 29/05 | 209/393 |

(56) References Cited

U.S. PATENT DOCUMENTS

| | | | | |
|---|---|---|---|---|
| 4,202,777 A * | 5/1980 | Schall | B01D 35/28 | 210/405 |
| 4,233,159 A * | 11/1980 | Senda | B01D 35/28 | 209/273 |
| 4,250,024 A * | 2/1981 | Soares | B03B 7/00 | 209/10 |
| 4,250,038 A * | 2/1981 | Dryden | B01D 35/28 | 209/264 |
| 4,268,382 A * | 5/1981 | Hanke | B01D 35/28 | 209/273 |
| 4,274,952 A * | 6/1981 | Hanke | B01D 35/28 | 209/273 |
| 4,297,213 A * | 10/1981 | Airey | A01J 25/11 | 210/195.1 |
| 4,300,445 A * | 11/1981 | Hazen | A01J 25/111 | 209/352 |
| 4,319,993 A * | 3/1982 | Krause | B07B 1/30 | 209/315 |
| 4,376,044 A * | 3/1983 | Ditzenberger | B07B 1/20 | 209/234 |
| 4,415,462 A * | 11/1983 | Finch | E02B 5/08 | 210/767 |
| 4,422,937 A * | 12/1983 | Connolly | B01D 35/28 | 209/264 |
| 4,437,982 A * | 3/1984 | Wasson | B03B 9/005 | 209/167 |
| 4,447,325 A * | 5/1984 | Pauley | B01D 29/118 | 210/295 |
| 4,505,812 A * | 3/1985 | Lees | B01D 33/0361 | 209/275 |
| 4,512,880 A * | 4/1985 | Connolly | B01D 35/28 | 209/250 |
| 4,519,902 A * | 5/1985 | Kinder | B01D 35/20 | 209/234 |
| 4,584,099 A * | 4/1986 | Burton | B01D 29/56 | 209/260 |
| 4,592,275 A * | 6/1986 | Frankl | B01D 36/00 | 99/495 |
| 4,661,253 A * | 4/1987 | Williams | B01D 29/05 | 210/411 |
| 4,666,602 A * | 5/1987 | Hartzell | A01C 3/00 | 210/298 |
| 4,671,877 A * | 6/1987 | Godbeer | B01D 35/28 | 210/409 |
| 4,710,296 A * | 12/1987 | Connolly | B01D 35/28 | 209/17 |
| 4,826,017 A * | 5/1989 | Du Bourg | B01D 33/0346 | 209/234 |
| 4,840,728 A * | 6/1989 | Connolly | B07B 1/46 | 209/397 |
| 4,857,176 A * | 8/1989 | Derrick | B07B 1/4609 | 209/392 |
| 4,863,597 A * | 9/1989 | Gilles | B01D 29/071 | 210/232 |
| 4,902,409 A * | 2/1990 | Clark | B01D 29/035 | 209/250 |
| 4,944,873 A * | 7/1990 | Williams | B01D 29/01 | 210/209 |
| 4,961,864 A * | 10/1990 | Bruke | B01D 29/03 | 210/791 |
| 4,981,587 A * | 1/1991 | Moorhead | B01D 29/035 | 210/402 |
| 4,990,249 A * | 2/1991 | Leuenberger | B01D 35/28 | 210/167.31 |
| 4,997,566 A * | 3/1991 | Davis | B01D 29/05 | 210/433.1 |
| 5,013,429 A * | 5/1991 | Krofta | C02F 3/1221 | 210/137 |
| 5,076,921 A * | 12/1991 | Bailey | B01D 33/41 | 210/255 |
| 5,098,557 A * | 3/1992 | Hirschler | B07B 9/00 | 209/240 |
| 5,108,626 A * | 4/1992 | Lees | B01D 33/0369 | 209/17 |
| 5,156,749 A * | 10/1992 | Williams | B01D 29/84 | 210/770 |
| 5,197,263 A * | 3/1993 | Midtling | A01D 44/00 | 210/242.3 |
| 5,246,579 A * | 9/1993 | Probstmeyer | B01D 29/071 | 210/232 |
| 5,255,790 A * | 10/1993 | Einoder | D21D 5/16 | 209/393 |
| 5,268,100 A * | 12/1993 | Hartzell | B01D 29/6484 | 210/396 |
| 5,279,736 A * | 1/1994 | Moorhead | B01D 29/035 | 210/383 |
| 5,330,643 A * | 7/1994 | Webb | B01D 29/01 | 210/255 |
| 5,354,467 A * | 10/1994 | Moorhead | B01D 29/035 | 210/420 |
| 5,413,709 A * | 5/1995 | Webb | B01D 29/01 | 210/255 |
| 5,425,876 A * | 6/1995 | Rector | B01D 29/01 | 210/354 |
| 5,429,247 A * | 7/1995 | Lemay | B07B 1/00 | 209/17 |
| 5,451,315 A * | 9/1995 | Miller | E21F 13/04 | 193/34 |
| 5,531,889 A * | 7/1996 | Baron | B01D 29/01 | 210/805 |
| 5,547,569 A * | 8/1996 | Spencer | B01D 21/0012 | 210/206 |
| 5,575,913 A * | 11/1996 | Sharkey | B01D 29/01 | 210/409 |
| 5,624,038 A * | 4/1997 | Curtis | B07B 1/04 | 209/281 |
| 5,674,386 A * | 10/1997 | Filion | E03F 5/12 | 210/154 |
| 5,709,051 A * | 1/1998 | Mazziotti | E04D 13/076 | 210/162 |
| 5,746,322 A * | 5/1998 | LaVeine | B07B 1/12 | 209/393 |
| 5,749,471 A * | 5/1998 | Andersson | B07B 1/46 | 209/314 |
| 5,765,696 A * | 6/1998 | Pryor | B07B 1/46 | 209/275 |
| 5,779,887 A * | 7/1998 | Rector | B01D 29/01 | 210/159 |
| 5,819,951 A * | 10/1998 | Sultanovich | B07B 1/4654 | 209/313 |
| 5,904,843 A * | 5/1999 | Herbst | B01D 29/6476 | 210/167.14 |
| 6,024,870 A * | 2/2000 | Thompson | B01D 29/01 | 210/151 |
| 6,063,296 A * | 5/2000 | Ackerman | B01D 29/05 | 210/767 |
| 6,095,338 A * | 8/2000 | Connolly | B07B 1/4681 | 209/274 |
| 6,325,215 B1 * | 12/2001 | Anthony | B07B 9/00 | 209/21 |
| 6,354,442 B1 * | 3/2002 | Obst | B01D 29/01 | 210/353 |
| 6,497,816 B2 * | 12/2002 | Naddy | B01D 29/336 | 210/162 |
| 6,511,595 B2 * | 1/2003 | Crompton | B01D 21/0012 | 210/162 |
| 6,531,057 B1 * | 3/2003 | Houle | B01D 21/2455 | 210/104 |
| 6,540,911 B1 * | 4/2003 | Bajema | B01D 29/925 | 210/154 |
| 6,619,312 B2 * | 9/2003 | Doiron | E03B 3/02 | 137/122 |
| 6,672,462 B2 * | 1/2004 | Sharkey | B01D 29/01 | 210/409 |
| 6,705,049 B2 * | 3/2004 | Esmond | E04D 13/08 | 210/154 |
| 6,749,068 B1 * | 6/2004 | Dias | B01D 29/6438 | 209/132 |

(56) References Cited

U.S. PATENT DOCUMENTS

| | | | |
|---|---|---|---|
| 6,773,612 B2* | 8/2004 | Dias | B01D 29/035 210/767 |
| 6,830,155 B2* | 12/2004 | Trench | B07B 1/284 209/680 |
| 6,863,181 B2* | 3/2005 | Dias | B01D 29/6438 209/268 |
| 6,892,891 B2* | 5/2005 | Dias | B01D 29/66 209/625 |
| 6,926,839 B2* | 8/2005 | Sharkey | B01D 29/01 210/767 |
| 6,936,164 B2* | 8/2005 | Wade | E04D 13/08 210/157 |
| 6,953,529 B2* | 10/2005 | Weir | B01D 29/01 210/791 |
| 6,986,849 B2* | 1/2006 | Irvine | B01D 21/0012 210/791 |
| 7,122,119 B2* | 10/2006 | Gribble | B01D 29/05 210/232 |
| 7,258,785 B2* | 8/2007 | Weir | E03F 5/0404 210/163 |
| 7,300,590 B2* | 11/2007 | Weir | E03F 1/00 210/747.3 |
| 7,303,672 B2* | 12/2007 | Irvine | B01D 21/0009 210/223 |
| D575,853 S * | 8/2008 | Adamson | D23/267 |
| 7,455,784 B2* | 11/2008 | Irvine | B01D 21/0012 210/791 |
| D589,127 S * | 3/2009 | Cornwall | D23/268 |
| 7,550,077 B2* | 6/2009 | Graf | E03B 3/02 210/162 |
| 7,584,577 B2* | 9/2009 | Esmond | E04D 13/08 210/251 |
| 7,708,494 B2* | 5/2010 | McLaughlin | E02B 8/08 405/81 |
| 7,799,231 B2* | 9/2010 | Irvine | B01D 29/01 210/695 |
| 7,805,890 B2* | 10/2010 | Esmond | E04D 13/08 52/12 |
| 7,882,959 B1* | 2/2011 | Augst | B07B 1/4681 209/308 |
| 7,919,002 B1* | 4/2011 | Hurtado | E04D 13/08 210/747.2 |
| 8,033,058 B2* | 10/2011 | Block | E04D 13/08 52/12 |
| 8,404,110 B2* | 3/2013 | Block | E04D 13/08 210/94 |
| 8,418,856 B2* | 4/2013 | Bailey | B01D 33/37 209/268 |
| 8,557,127 B2* | 10/2013 | Houle | B65G 19/08 210/768 |
| 8,562,832 B2* | 10/2013 | Houle | B01D 33/0369 210/255 |
| 8,747,666 B2* | 6/2014 | Miller | B01D 17/0211 210/255 |
| 8,757,392 B2* | 6/2014 | LaVeine | B07B 1/485 209/319 |
| 8,813,968 B1* | 8/2014 | Mandeville | B07B 13/16 209/281 |
| 9,233,398 B2* | 1/2016 | Dahl | B07B 13/16 |
| 9,260,321 B2* | 2/2016 | Garios | E04D 13/0767 |
| 9,409,208 B2* | 8/2016 | Convery | B07B 1/4609 |
| 9,427,780 B2* | 8/2016 | Houle | B01D 33/0376 |
| 9,457,381 B2* | 10/2016 | Gordon | B07B 1/46 |
| 9,567,719 B2* | 2/2017 | Doyle | E02B 1/006 |
| 9,682,334 B2* | 6/2017 | Bioton | B01D 29/445 |
| 9,908,147 B2* | 3/2018 | Flansburg | B01D 29/908 |
| 10,125,496 B2* | 11/2018 | Lenney | E04D 13/0727 |
| 10,695,800 B2* | 6/2020 | Lazzarini | B07B 1/46 |
| 10,791,869 B2* | 10/2020 | Al-Shaibani | A47J 42/40 |
| 10,953,437 B2* | 3/2021 | Herzog | B29C 64/35 |
| 11,066,798 B2* | 7/2021 | Paczek | E02B 9/04 |
| 2001/0004973 A1* | 6/2001 | Asakawa | A01C 3/00 209/326 |
| 2001/0013492 A1* | 8/2001 | Dias | B01D 29/6438 210/409 |
| 2002/0153334 A1* | 10/2002 | Sharkey | B01D 29/01 210/791 |
| 2002/0175120 A1* | 11/2002 | Norell | B01D 29/012 210/499 |
| 2002/0195377 A1* | 12/2002 | Trench | B07B 1/4645 209/365.1 |
| 2003/0094424 A1* | 5/2003 | Dias | B01D 29/035 210/768 |
| 2003/0116511 A1* | 6/2003 | Dias | B01D 29/902 210/768 |
| 2003/0127375 A1* | 7/2003 | Gribble | B01D 29/05 210/101 |
| 2003/0167700 A1* | 9/2003 | Esmond | E04D 13/08 52/12 |
| 2004/0222167 A1* | 11/2004 | Weir | B01D 29/603 210/767 |
| 2004/0245152 A1* | 12/2004 | Dias | B01D 29/902 209/273 |
| 2005/0072738 A1* | 4/2005 | Weir | E03F 5/0404 210/691 |
| 2005/0246967 A1* | 11/2005 | Esmond | E04D 13/08 52/16 |
| 2006/0150531 A1* | 7/2006 | Cann | E03B 3/03 52/11 |
| 2008/0086953 A1* | 4/2008 | Graf | E03B 3/02 52/12 |
| 2008/0101867 A1* | 5/2008 | McLaughlin | E02B 1/006 405/83 |
| 2009/0236273 A1* | 9/2009 | Esmond | E04D 13/08 210/155 |
| 2010/0038300 A1* | 2/2010 | Allan | E03F 1/002 210/248 |
| 2010/0270219 A1* | 10/2010 | Block | E04D 13/08 210/162 |
| 2011/0278217 A1* | 11/2011 | Inoue | B01D 29/44 210/499 |
| 2011/0303307 A1* | 12/2011 | Block | E04D 13/08 137/357 |
| 2011/0315623 A1* | 12/2011 | Motakef | B01D 29/44 210/499 |
| 2013/0105369 A1* | 5/2013 | Houle | B07B 1/469 209/240 |
| 2013/0105409 A1* | 5/2013 | Houle | B01D 33/0361 210/770 |
| 2013/0105413 A1* | 5/2013 | Houle | B07B 1/46 210/785 |
| 2018/0055289 A1* | 3/2018 | Al-Shaibani | A47J 31/42 |
| 2019/0070636 A1* | 3/2019 | Lazzarini | B07B 1/12 |
| 2020/0392687 A1* | 12/2020 | Paczek | E02B 8/06 |
| 2021/0205741 A1* | 7/2021 | Dai | B01D 29/56 |

* cited by examiner

FILTERING DEVICE FOR REMOVING IMPURITIES IN A MIXTURE OF BIOLOGICAL DIATOMITE

CROSS REFERENCES TO THE RELATED APPLICATIONS

This application is based upon and claims priority to Chinese Patent Application No. 202010008273.6, filed on Jan. 6, 2020, the entire contents of which are incorporated herein by reference.

TECHNICAL FIELD

The present invention relates to the field of sewage filtration and treatment, and more particularly to a filtering device for removing impurities in a mixture of biological diatomite.

BACKGROUND

The biological diatomite mixture is a mixture with high sludge concentration, proper viscosity and slower flow rate than normal sewage. The traditional filtering device for removing impurities in the biological diatomite mixture is generally a single-layer screen or bar. After the biological diatomite mixture passes through a single-layer screen or a bar, the particles and impurities in the mixture with the particle size larger than the mesh size of the screen or the bar are retained.

Due to the limited daily treatment capacity of the single-layer screen, the filtration efficiency of the traditional filtration device for the biological diatomite mixture is relatively low. If the sewage treatment capacity is large, then a large floor area is required to increase the area of the parallel screen. In addition, there are many fine particles in the biological diatomite mixture. When the traditional filtration device is used to treat the biological diatomite mixture, the filter plate is likely to be partially blocked, resulting in no sewage flow or a slow flow speed in part of the gap, which reduces the flow area of the filter plate and the filtration efficiency. Moreover, the traditional filtration device cannot selectively intercept the particles with different particle sizes. When the sewage containing the impurities with different particle sizes passes through the filter plate with the same gap, it is prone to the blockage of the filter plate, thus further reducing the filtration efficiency of the filtration device.

SUMMARY

In view of the above technical problems, the present invention provides a filtering device for removing impurities in a mixture of biological diatomite. The filtering device has a simple structure. By spatially stacking multiple layers of filter plate units and setting the filter plates into inclined curved filter plates, the problem of clogging that easily occurs in the filter plates can be alleviated which saves space, and can greatly improve the filtration efficiency of diatomite mixed solution. By installing a deflector and a depressed plate, the water distribution can be made more uniform, thereby alleviating the accumulation of the diatomite mixture unevenly distributed on the filter plate due to uneven water distribution, which can further avoid the clogging of the filter plate and improve the filtration efficiency of the filtering device.

To achieve the above technical objectives, the technical solutions of the present invention are as follows.

A filtering device for removing impurities in a mixture of biological diatomite includes a water inlet pipe, a shunt pipe, a plurality of deflectors, a filter unit and a water collecting pipe. The plurality of deflectors are evenly distributed in multiple layers in the vertical direction. Each deflector includes a shell and a top plate, and the left and right sides of each deflector are symmetrically provided with a filter unit. The shell is provided with the top plate, and the top plate is hinged with the depressed plate through a hinge. The bottom of the shell is provided with a water inlet. The water inlet is communicated with the shunt pipe. A water distribution valve is provided on the shunt pipe, and overflow ports are provided on the upper left and right side walls of the shell. A plurality of diversion folding plates are horizontally arranged under the overflow port, and the plurality of diversion folding plates are staggered and distributed on the left and right side walls of the shell in the vertical direction.

The filter unit includes a water guide groove and a filter plate. The water guide groove and the filter plate are fixedly connected to the side wall of the shell. The water guide groove is arranged obliquely relative to the side wall. A water collecting space with a top opening is formed between the water guide groove and the side wall of the shell. A water collecting port is arranged on a front groove wall of the water guide groove, and the water collecting port is connected to the water collecting pipe. The filter plate is obliquely arranged in the water collecting space. The top of the filter plate is flush with the bottom of the overflow port, and the bottom of the filter plate is flush with the top of the right groove wall of the water guide groove. The water inlet pipe is communicated with each shunt pipe. A water outlet pipe is connected to the water collecting pipe, and the water outlet pipe is provided with a water outlet valve.

The filtering device has a simple structure. By spatially stacking multiple layers of filter plate units and setting the filter plates into inclined curved filter plates, the problem of clogging that easily occurs in the filter plates can be alleviated, which saves space and improves the filtration efficiency of diatomite mixed solution. By installing a deflector and a depressed plate, the water distribution can be made more uniform, thereby alleviating the accumulation of the diatomite mixture unevenly distributed on the filter plate due to uneven water distribution, which can further avoid clogging of the filter plate and improve filtration efficiency.

Preferably, the bottom of the water guide groove is a curved surface. In this way, the volume of the collecting space of the water guide groove is increased. The water filtered by the filter plate is readily diverted to the water guide groove.

Preferably, the filter plate is an arc-shaped mesh plate curved toward the water collecting space. In this way, the filtering area of the filter plate can be increased, and the filtering efficiency of the device can be improved, which is conducive to guiding the water filtered by the filter plate into the water guide groove.

Preferably, the filter plate is a screen with a clearance of 0.5-5 mm grid or mesh no less than 50 meshes.

Preferably, the bottom of the filter plate is smoothly connected to a slag guide plate.

Preferably, the filter unit also includes an upper shutter for covering. The upper shutter includes an arc-shaped plate arranged obliquely and bent towards the filter plate. The top of the arc-shaped plate is fixedly connected to the top of the depressed plate, and the spaced distance between the arc-shaped plate and the filter plate is more than 10 cm.

Preferably, the filtering device also includes a water return pipe. One end of the water return pipe is connected to a collecting pipe, and the other end is connected to the water inlet pipe. The water return pipe is provided with a water return valve.

Preferably, the filter plate in the filter unit corresponding to the upper layer deflector has a larger filter hole than the filter plate in the filter unit corresponding to the adjacent lower layer deflector, which is conducive to the effective interception and removal of impurities of different particle sizes and further improves filtration efficiency.

Preferably, the filter plate in the filter unit corresponding to the upper layer deflector has a smaller filter hole than the filter plate in the filter unit corresponding to the adjacent lower layer deflector.

The advantages of the invention are as follows.

(1) The filtering device has a simple structure. By spatially stacking multiple layers of filter plate units and setting the filter plates 52 into inclined curved filter plates 52, the problem of clogging that easily occurs in the filter plates can be alleviated. This saves space and improves filtration efficiency of the diatomite mixed solution. By installing the deflector 30 and the depressed plate 40, the water distribution can be made more uniform thus alleviating the accumulation of the diatomite mixture unevenly distributed on the filter plate 52 due to uneven water distribution, which can further avoid the clogging of the filter plate and improve the filtration efficiency of the device.

(2) The present invention facilitates the effective interception and removal of impurities with different particle sizes by combining materials of the filter plate 52 with different pore sizes in different filter plate units, thereby further improving the filtration efficiency. Taking the two-layer filter unit as an example, the filter plate 52 in the upper filter plate unit adopts a large filter hole structure, and the filter plate 52 in the lower filter plate unit adopts a small filter hole structure. In use, the water distribution valve 21 corresponding to the upper filter plate unit is first opened, and the water distribution valve 21 corresponding to the lower filter plate unit is closed. The diatomite mixture is filtered once by the upper filter plate unit to remove large particles of impurities. Then, the water distribution valve 21 corresponding to the lower filter plate unit is opened, and the water distribution valve 21 corresponding to the upper filter plate unit is closed. The primary filtered water is subjected to secondary filtration through the water return pipe 70. The water inlet pipe 10 and the lower filter plate 52 unit to remove small particles of impurities.

(3) The filter residue trapped after being filtered by the filtering device of the present invention can slide along the slag guide plate 54 through the hydraulic impact of the incoming water and then fall and the filter residue easily cleaned. In addition, the present invention can clean and remove slag from one of the filter units without affecting the work of other filter units.

10. water inlet pipe; 20. shunt pipe; 21. water distribution valve; 30. deflector; 31. shell; 311. water inlet; 312. overflow port; 313. diversion folding plate; 32. top plate; 40. depressed plate; 51. water guide groove; 511. water collecting port; 512. water collecting space; 52. filter plate; 53. upper shutter; 54. slag guide plate; 60. water collecting pipe; 70. water return pipe; 71. water return valve; 80. water outlet pipe.

DETAILED DESCRIPTION OF THE EMBODIMENTS

Figure 1:
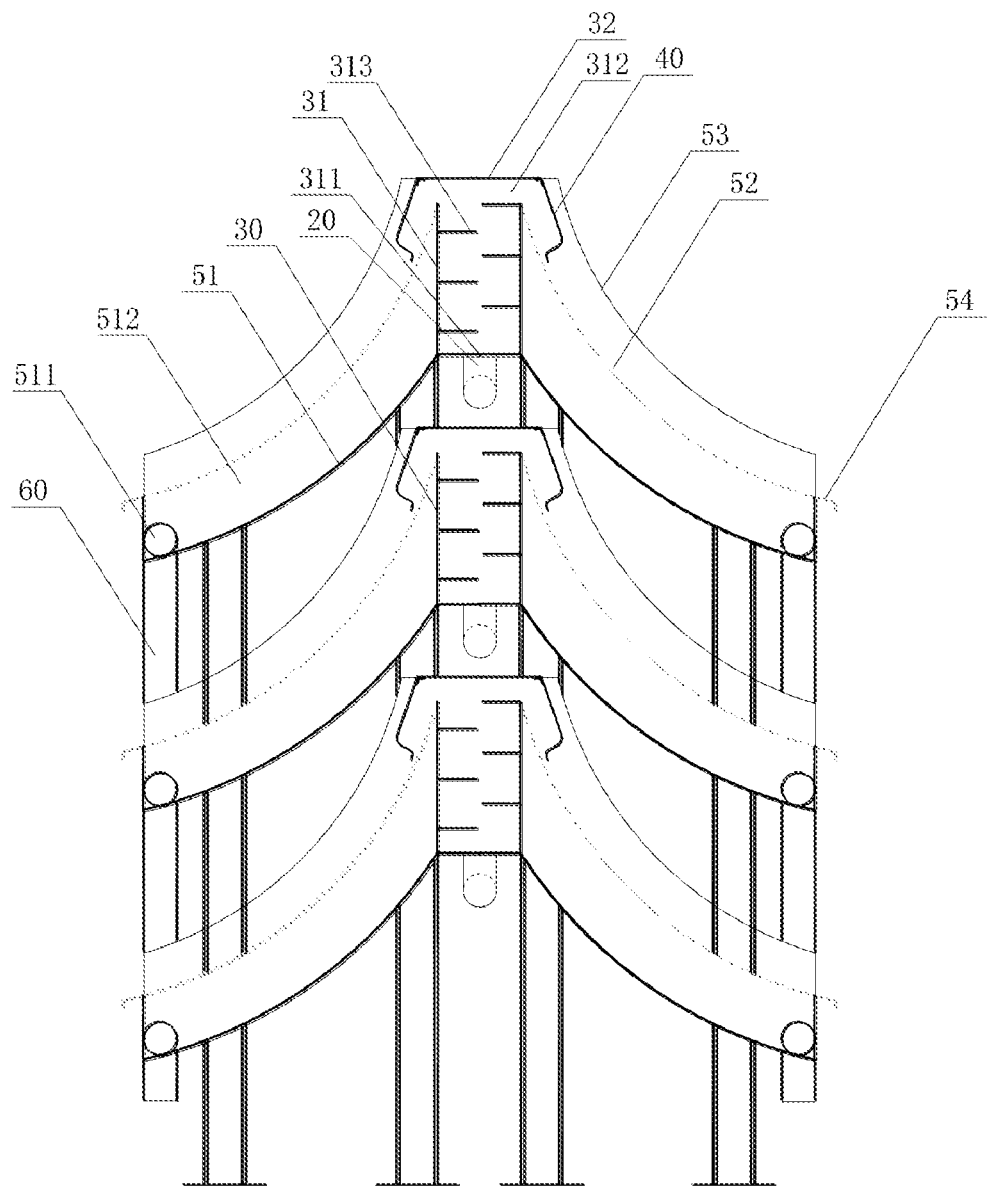
FIG. 1 is a structural diagram of the present invention.
Figure 2:
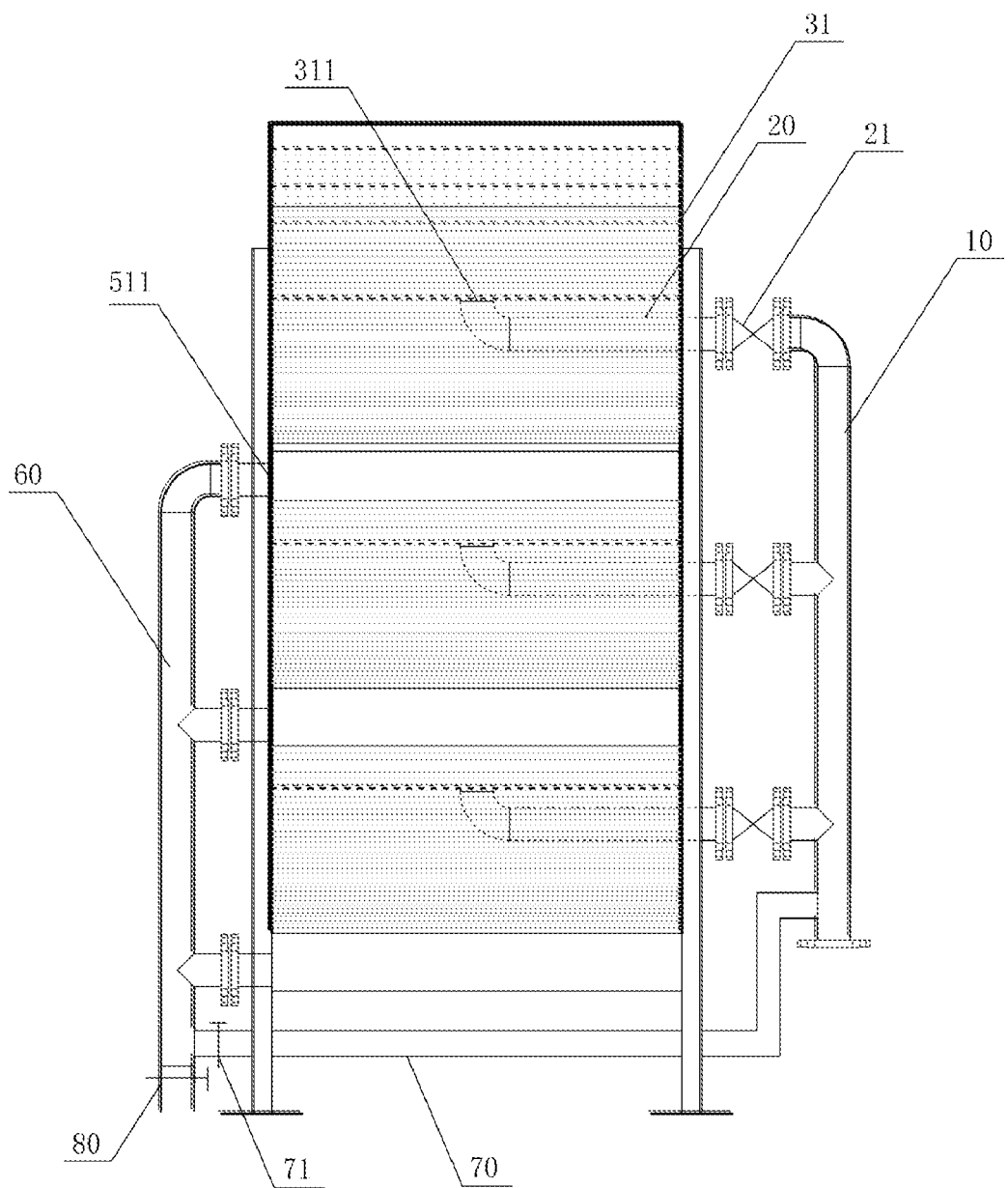
FIG. 2 is a side view of the present invention.
Figure 3:
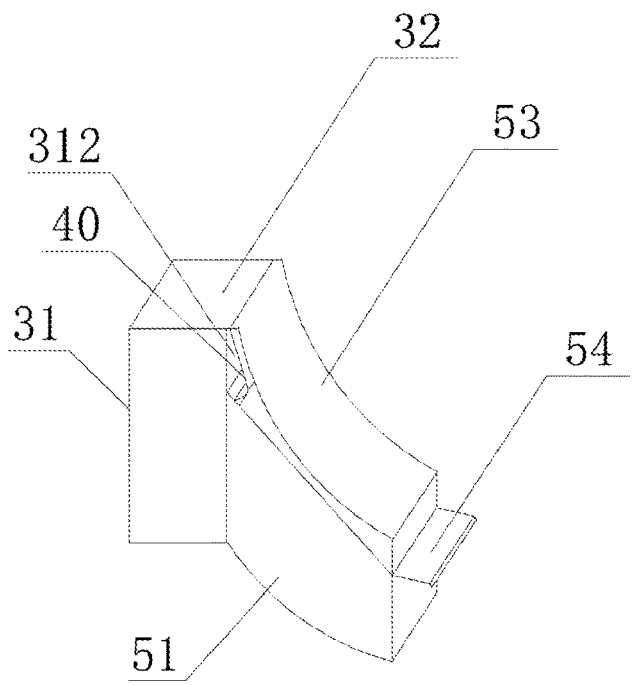
FIG. 3 is a structural diagram of a filter unit in the present invention.
Figure 4:
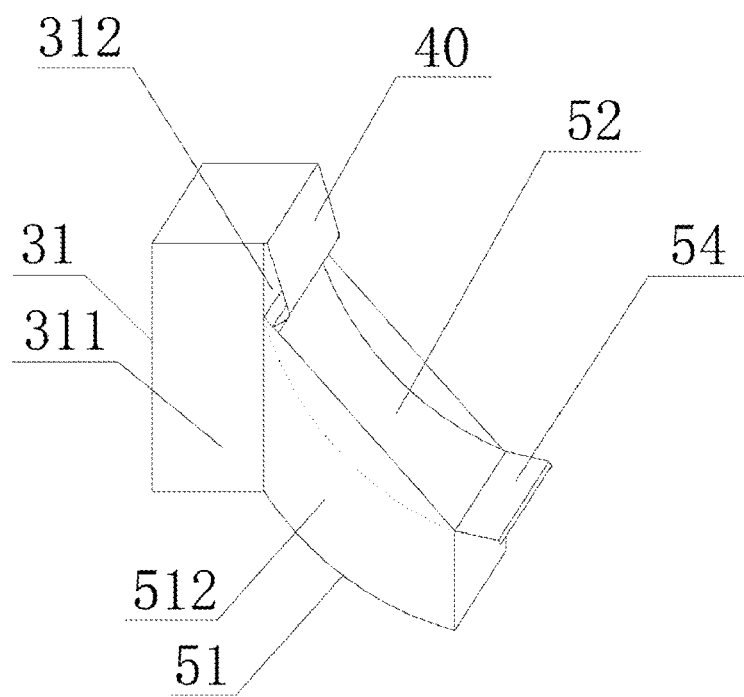
FIG. 4 is a structural diagram of a filter unit in the present invention;
Reference numerals are as follows.

A specific embodiment of the present invention is described in detail with reference to FIGS. 1 to 4, but does not limit the claims of the present invention in any way.

As shown in FIGS. 1 to 4, a filtering device for removing impurities in a mixture of biological diatomite includes the water inlet pipe 10, the shunt pipe 20, the plurality of deflectors 30, the filter unit and the water collecting pipe 60.

The plurality of deflectors 30 are evenly distributed in multiple layers in the vertical direction. Each deflector 30 includes the shell 31 and the top plate 32, and the left and right sides of each deflector 30 are symmetrically provided with a filter unit.

The shell 31 is provided with the top plate 32, and the top plate 32 is hinged with the depressed plate 40 through a hinge. The bottom of the shell 31 is provided with the water inlet 311. The water inlet 311 is communicated with the shunt pipe 20. The water distribution valve 21 is provided on the shunt pipe 20, and the overflow ports 312 are provided on the upper left and right side walls of the shell 31. The plurality of diversion folding plates 313 are horizontally arranged under the overflow port 312, and the plurality of diversion folding plates 313 are staggered and distributed on the left and right side walls of the shell 31 in the vertical direction.

The filter unit includes the water guide groove 51, the filter plate 52 and the upper shutter 53. The water guide groove 51 is inclined and fixedly connected to the wall of the shell 31. The water guide groove 51 in the filter unit located on the left side of the shell 31 is fixedly connected to the left side wall of the shell 31, and the water guide groove 51 in the filter unit located on the right side of the shell 31 is fixedly connected to the right side wall of the shell 31. The water collecting space 512 with an open top is formed between the water guide groove 51 and the side wall of the shell 31. The water collecting port 511 is provided on the front groove wall of the water guide groove 51, and the water collecting port 511 communicates with the water collecting pipe 60. In order to increase the water collecting space 512 of the water guide groove 51, the bottom of the water guide groove 51 is set as an arc surface.

The filter plate 52 is located in the water collecting space 512. The filter plate 52 is inclined and fixedly connected to the side wall of the shell 31. The top of the filter plate 52 is flush with the bottom of the overflow port 312, and the bottom of the filter plate 52 is flush with the top of the right wall of the water guide groove 51. The slag guide plate 54 is smoothly connected to the bottom end of the filter plate 52. In order to increase the filtering area of the filter plate 52 and improve the filtering efficiency of the filtering device, the filter plate 52 is provided as an arc-shaped mesh plate curved toward the water collecting space 512.

The upper shutter 53 functions as a cover. The upper shutter 53 includes an arc-shaped plate that is inclined and bent toward the filter plate 52. The arc-shaped plate is located above the filter plate 52, and the spaced distance between it and the filter plate 52 is greater than 10 cm. The top of the curved plate is fixedly connected to the top of the water pressure plate 40.

The water inlet pipe 10 is connected to each branch pipe 20.

The water outlet pipe 80 is connected to the water collecting pipe 60, and the water outlet pipe 80 is provided with a water outlet valve.

In order to improve the filtering effect of the device on the impurities in the biological diatomite mixed solution, the filtering device is further provided with the water return pipe 70. The two ends of the water return pipe 70 connect with the water collecting pipe 60 and the water inlet pipe 10, respectively. The water return valve 71 is provided on the water return pipe 70. During operation of the device, the water outlet valve is closed. The water return valve 71 and the water distribution valve 21 are opened, so that the filtered water once filtered by the filter unit can pass through the water collecting pipe 60, the water return pipe 70 and the shunt pipe 20 in sequence. The filtered water then may enter the filter unit again for secondary filtration to improve the water quality of the effluent from the filtering device.

The filter plate in the filter unit corresponding to the upper layer deflector has a larger or smaller filter hole than the filter plate in the filter unit corresponding to the adjacent lower layer deflector to effectively intercept and remove impurities with different particle sizes in the biological diatomite mixture and further improve the filtration efficiency.

How it works:

The sewage (biological diatomite mixture) enters the deflector 30 through the water inlet pipe 10, the water distribution valve 21 and the shunt pipe 20 in sequence. Through the rectification and energy dissipation of the diversion folding plates 313 in the deflector 30. The sewage flows out uniformly from the overflow port 312 of the deflector 30. Under the function of secondary rectification and energy dissipation of the depressed plate 40, the sewage flows out uniformly from the lower side of the depressed plate 40 and is filtered through the filter plate 52 from top to bottom. The water filtered by the filter plate 52 enters the water guide groove 51, and flows into the water collecting pipe 60 through the water collecting port 511. The filter residue trapped after being filtered by the filter plate 52 slides along the residue guide plate 54 by the hydraulic impact of the incoming water and then falls.

The implementations mentioned above are only for the purpose of illustrating the present invention, and are not intended to limit the present invention. Those ordinary skilled in the prior art may make various changes and modifications, without departing from the essence and scope of the present invention. Therefore, all equivalent technical solutions should also belong to the scope of the present invention.

What is claimed is:

1. A filtering device for removing impurities in a mixture of biological diatomite, comprising a water inlet pipe, a plurality of shunt pipes, a plurality of deflectors, a filter unit and a water collecting pipe, wherein the plurality of deflectors are evenly distributed in a plurality of layers in a vertical direction, each deflector of the plurality of deflectors comprises a shell and a top plate, and a left side and a right side of each deflector of the plurality of deflectors are symmetrically provided with the filter unit;

a top of the shell is covered with the top plate, and the top plate is hinged with a depressed plate through a hinge, a bottom of the shell is provided with a water inlet, the water inlet pipe is in fluid communication with each of the plurality of shunt pipes, a water distribution valve is provided on the plurality of shunt pipes, and a plurality of overflow ports are provided on upper portions of a left side wall and a right side wall of the shell;

a plurality of diversion folding plates are horizontally arranged under the plurality of overflow ports, and the plurality of diversion folding plates are staggered and distributed on the left side wall and the right side wall of the shell in the vertical direction; the filter unit comprises a water guide groove and a filter plate, the water guide groove and the filter plate are fixedly connected to a side wall of the shell, the water guide groove is arranged obliquely, a water collecting space with a top opening is formed between the water guide groove and the side wall of the shell, a water collecting port is arranged on a front groove wall of the water guide groove, and the water collecting port is connected to the water collecting pipe;

the filter plate is obliquely arranged in the water collecting space, a top of the filter plate is flush with a bottom of the plurality of overflow ports, and a bottom of the filter plate is flush with a top of a right groove wall of the water guide groove; and a water outlet pipe is connected to the water collecting pipe, and the water outlet pipe is provided with a water outlet valve.

2. The filtering device according to claim 1, wherein a bottom of the water guide groove is a curved surface.

3. The filtering device according to claim 1, wherein the filter plate is an arc-shaped mesh plate and the arc-shaped mesh plate is curved toward the water collecting space.

4. The filtering device according to claim 1, wherein the filter plate is a screen with a clearance of 0.5-5 mm grid or mesh no less than 50 mesh.

5. The filtering device according to claim 1, wherein the bottom of the filter plate is connected to a slag guide plate.

6. The filtering device according to claim 1, wherein the filter unit further comprising an upper shutter for covering, the upper shutter comprises an arc-shaped plate, the arc-shaped plate is arranged obliquely and bent towards the filter plate, a top of the arc-shaped plate is fixedly connected to a top of the depressed plate, and a spaced distance between the arc-shaped plate and the filter plate is more than 10 cm.

7. The filtering device according to claim 1, further comprising a water return pipe, a first end of the water return pipe is connected to a collecting pipe, a second end of the water return pipe is connected to the water inlet pipe, and the water return pipe is provided with a water return valve.

8. The filtering device according to claim 7, wherein the filter plate in the filter unit corresponding to an upper layer deflector has a larger filter hole than the filter plate in the filter unit corresponding to an adjacent lower layer deflector.

9. The filtering device according to claim 7, wherein the filter plate in the filter unit corresponding to an upper layer deflector has a smaller filter hole than the filter plate in the filter unit corresponding to an adjacent lower layer deflector.

* * * * *